(12) United States Patent
Wen

(10) Patent No.: US 11,500,148 B2
(45) Date of Patent: Nov. 15, 2022

(54) DISPLAY APPARATUS AND HOLDER THEREOF

(71) Applicant: E Ink Holdings Inc., Hsinchu (TW)

(72) Inventor: Yu-Chuan Wen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/445,955

(22) Filed: Aug. 26, 2021

(65) Prior Publication Data

US 2022/0163717 A1 May 26, 2022

(30) Foreign Application Priority Data

Nov. 25, 2020 (TW) ................. 109141299

(51) Int. Cl.
| | | |
|---|---|---|
| *F21V 8/00* | (2006.01) | |
| *G02F 1/1333* | (2006.01) | |
| *G02F 1/1677* | (2019.01) | |

(52) U.S. Cl.
CPC ......... *G02B 6/0088* (2013.01); *G02B 6/0021* (2013.01); *G02B 6/0045* (2013.01); *G02B 6/0091* (2013.01); *G02F 1/13338* (2013.01); *G02F 1/1677* (2019.01); *G02F 2201/07* (2013.01); *G02F 2203/02* (2013.01)

(58) Field of Classification Search
CPC .. G02B 6/0088; G02B 6/0091; G02B 6/0021; G02B 6/0045; G02B 6/0081; G02B 6/4289; G02B 6/0026; G02B 6/4286; G02F 1/13338; G02F 1/1677; G02F 1/1336; G02F 2201/07; G02F 2201/58; G02F 2203/02

See application file for complete search history.

(56) References Cited

U.S. PATENT DOCUMENTS

| 7,911,700 B2 | 3/2011 | Chao et al. |
| 2017/0363800 A1 | 12/2017 | Liu et al. |
| 2019/0164932 A1 | 5/2019 | Lee et al. |

FOREIGN PATENT DOCUMENTS

| TW | I534685 B | 5/2016 |
| TW | 201713972 A | 4/2017 |
| TW | I629623 B | 7/2018 |

OTHER PUBLICATIONS

Corresponding Taiwan office action dated Jan. 20, 2022.

*Primary Examiner* — Anne M Hines
*Assistant Examiner* — Jose M Diaz
(74) *Attorney, Agent, or Firm* — CKC & Partners Co., LLC

(57) ABSTRACT

The holder is suitable for a display apparatus, where the display apparatus includes a light guide plate and a display panel. The light guide plate includes a light emitting portion and a curved portion connected to the light emitting portion, and the display panel has a bottom surface and a side surface connected to the bottom surface. At least one part of the holder is attached to the side surface of the display panel, and the holder is wrapped with the curved portion of the light guide plate.

22 Claims, 9 Drawing Sheets

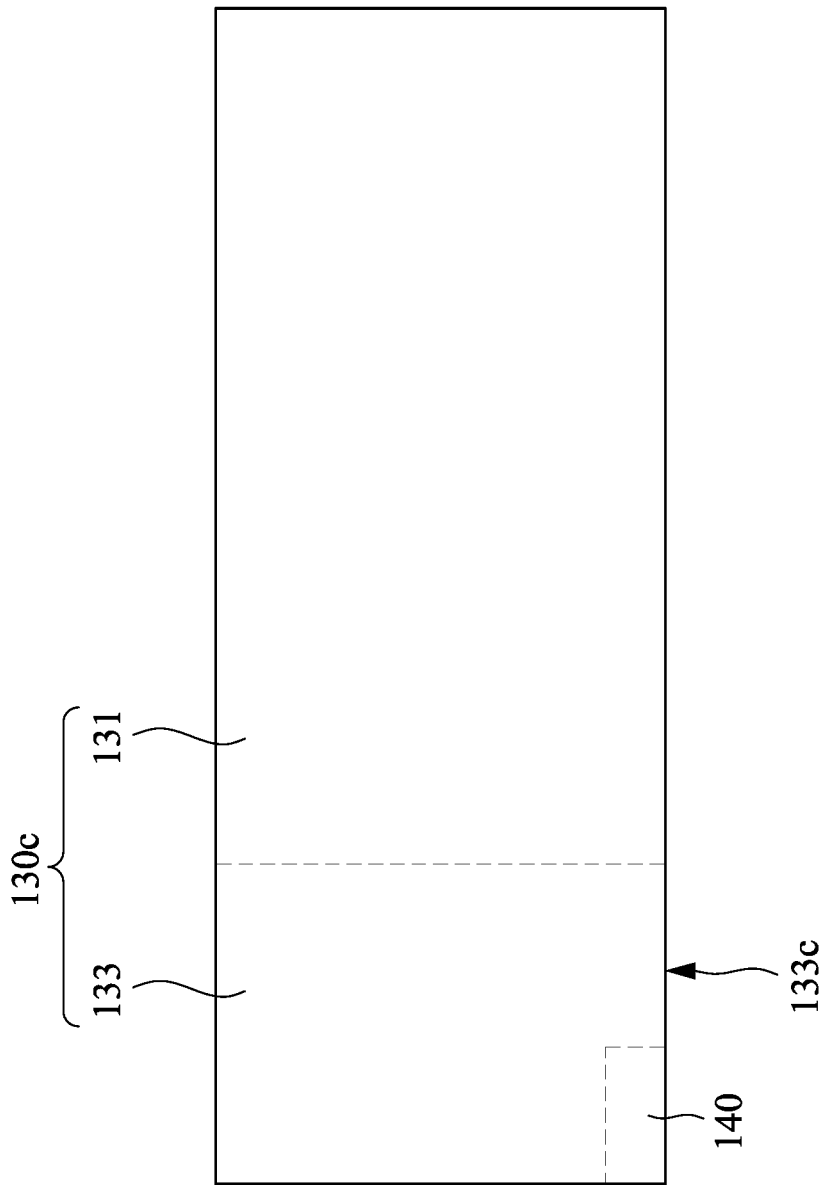

DISPLAY APPARATUS AND HOLDER THEREOF

CROSS-REFERENCE TO RELATED APPLICATION

This application claims priority to Taiwan Application Serial Number 109141299, filed Nov. 25, 2020, which is herein incorporated by reference in its entirety.

BACKGROUND

Technical Field

The present disclosure relates to display apparatus. More particularly, the present disclosure relates to a holder and a display apparatus including the holder and a light guide plate.

Description of Related Art

A conventional display apparatus with a light guide plate has used light emitting diode (LED) as the light source, and the display apparatus is usually equipped with a plurality of LEDs for producing even brightness. However, when the display apparatus is equipped with fewer LEDs, it is possible to increase the pitch of the LEDs, so that it is easy to cause hot spots, resulting in uneven brightness of the screen and reducing the quality of the display apparatus.

SUMMARY

At least one embodiment of the disclosure provides a display apparatus, which uses a light guide plate including a curved portion to avoid or reduce the abovementioned hot spots.

At least one embodiment of the disclosure provides a holder, which can support the curved portion of the light guide plate.

A holder according to at least one embodiment of the disclosure is suitable for a display apparatus, in which the display apparatus includes a light guide plate and a display panel. The light guide plate includes a light emitting portion and a curved portion connected to the light emitting portion. The display panel has a bottom surface and a side surface connected to the bottom surface. At least one part of the holder is attached to the side surface of the display panel, and the curved portion wraps the holder.

A display apparatus according to at least one embodiment of the disclosure includes a display panel, the holder, a light guide plate, and a light emitting component. The display panel has a bottom surface, a top surface opposite to the bottom surface, and a side surface connected to the bottom surface and the top surface. The holder is fixed to the display panel, in which at least one part of the holder is attached to the side surface of the display panel. The light guide plate includes a light emitting portion and a curved portion. The light emitting portion is disposed on the top surface, and the curved portion is connected to the light emitting portion and covers the holder, where the curved portion has a light incident side. The light emitting component is disposed at the light incident side of the curved portion, in which the display panel is located between the light emitting component and the light emitting portion.

A display apparatus according to at least one embodiment of the disclosure a display panel, a circuit board, the holder, a light guide plate, and a light emitting component. The display panel has a bottom surface, a top surface opposite to the bottom surface, and a side surface connected to the bottom surface and the top surface. The circuit board is electrically connected to the display panel. The holder is fixed to the circuit board, where at least one part of the holder is attached to the side surface of the circuit board. The light guide plate includes a light emitting portion and a curved portion. The light emitting portion is disposed between the display panel and the circuit board, and the curved portion is connected to the light emitting portion and covers the holder, where the curved portion has a light incident side. The light emitting component is disposed at the light incident side of the curved portion.

Based on the above, the abovementioned light guide plate including the curved portion can guide the light of the light emitting component and cause the light to exit uniformly from the light emitting portion after passing through the curved portion, so as to reduce or avoid the uneven brightness due to the hot spots, thereby improving the quality of the display apparatus.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 1C is a schematic top view of another light guide plate applied to the display apparatus in FIG. 1A.

DETAILED DESCRIPTION

Figure 1A:
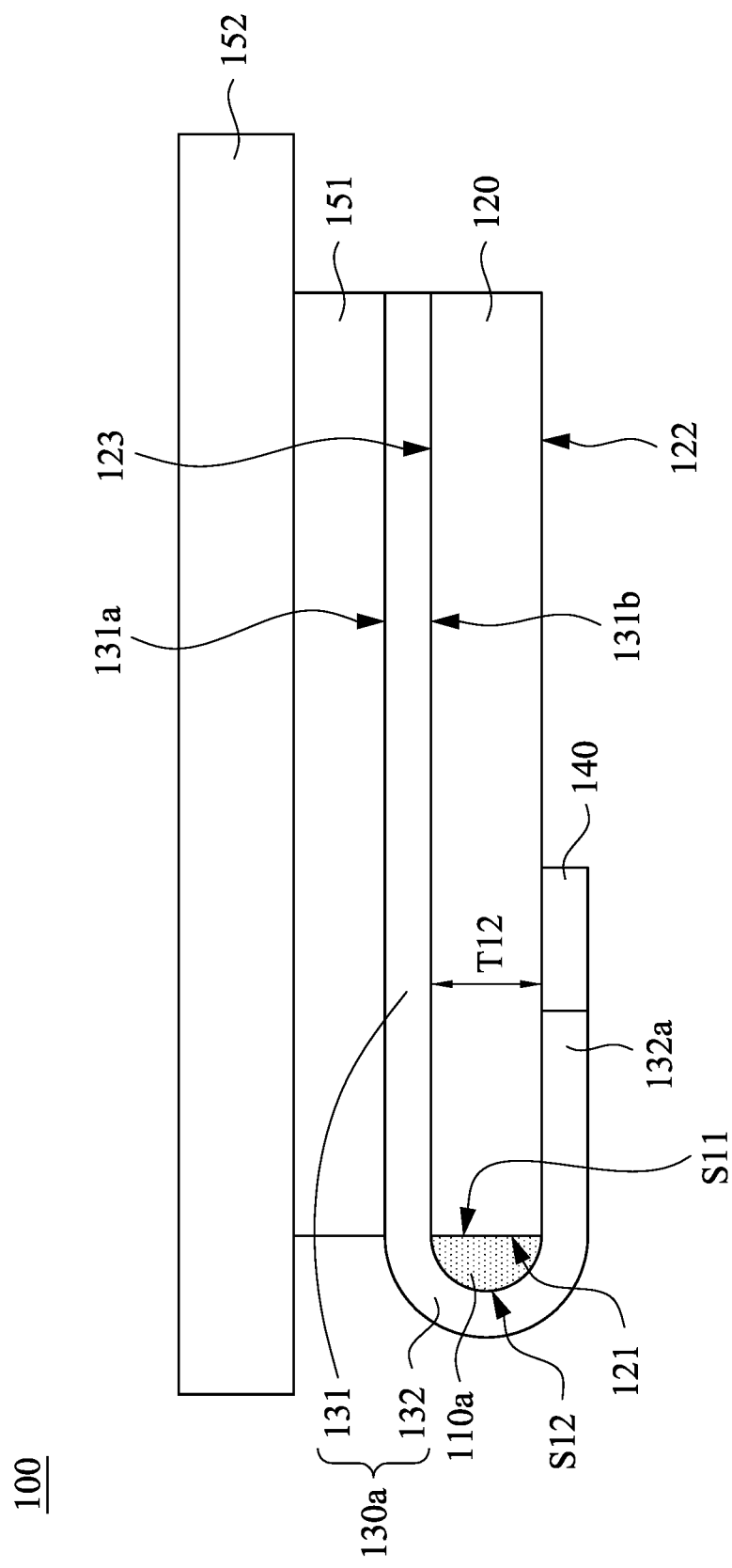
FIG. 1A is a schematic side view of a display apparatus according to at least one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

In the following description, in order to clearly present the technical features of the present disclosure, the dimensions (such as length, width, thickness, and depth) of elements (such as layers, films, substrates, and areas) in the drawings will be enlarged in unusual proportions. Accordingly, the description and explanation of the following embodiments are not limited to the sizes and shapes of the elements presented in the drawings, but should cover the sizes, shapes, and deviations of the two due to actual manufacturing processes and/or tolerances. For example, the flat surface shown in the drawings may have rough and/or non-linear characteristics, and the acute angle shown in the drawings may be round. Therefore, the elements presented in the drawings in this case which are mainly for illustration are intended neither to accurately depict the actual shape of the elements nor to limit the scope of patent applications in this case.

FIG. 1A is a schematic side view of a display apparatus according to at least one embodiment of the disclosure. Referring to FIG. 1A, the display apparatus 100 includes a holder 110a and a display panel 120, in which the holder 110a is fixed to the display panel 120. For example, the holder 110a can be adhered to the display panel 120 by adhesive, so that the holder 110a can be fixed to the display panel 120.

The display panel 120 has a side surface 121, a bottom surface 122, and a top surface 123, in which the top surface 123 is opposite to the bottom surface 122, and the side surface 121 is connected to the bottom surface 122 and the top surface 123. The display panel 120 can be a reflective display panel, so the display apparatus 100 can be a reflective display, where the images produced by the display panel 120 can appear on the top surface 123. In addition, the display panel 120 may be an electrowetting display panel or an electrophoretic display panel, for example.

The at least one part of the holder 110a is attached to the side surface 121 of the display panel 120. Taking FIG. 1A for example, the whole holder 110a can be attached to the side surface 121, but the holder 110a may not cover the bottom surface 122 of the display panel 120 at all, as shown in FIG. 1A. In addition, the holder 110a can be adhered to the side surface 121 of the display panel 120 by adhesive, so that the whole holder 110a is attached to the side surface 121.

The display apparatus 100 further includes a light guide plate 130a and a light emitting component 140, in which the light guide plate 130a includes a light emitting portion 131 and a curved portion 132. The light emitting portion 131 is disposed on the top surface 123 of the display panel 120. For example, the light emitting portion 131 can be adhered to the top surface 123 of the display panel 120 by optically clear adhesive (OCA). The curved portion 132 is connected to the light emitting portion 131 and extends from the light emitting portion 131.

The curved portion 132 wraps the holder 110a, and the holder 110a can be surrounded by the curved portion 132 and the display panel 120. The curved portion 132 has a light incident side 132a, and the light emitting component 140 is disposed at the light incident side 132a, in which the display panel 120 is located between the light emitting component 140 and the light emitting portion 131, as shown in FIG. 1A. In addition, the light emitting component 140 may be a LED.

The display apparatus 100 can further include a touch sensor panel 151 and a protective layer 152, in which the protective layer 152 may be a glass plate or a transparent plastic board. The touch sensor panel 151 is disposed on the light emitting portion 131, whereas the protective layer 152 is disposed on the touch sensor panel 151. By using the OCA, the touch sensor panel 151 can be adhered to the light emitting portion 131, and the protective layer 152 can be adhered to the touch sensor panel 151, so that both the touch sensor panel 151 and the protective layer 152 can be fixed on the light guide plate 130a.

Figure 1B:
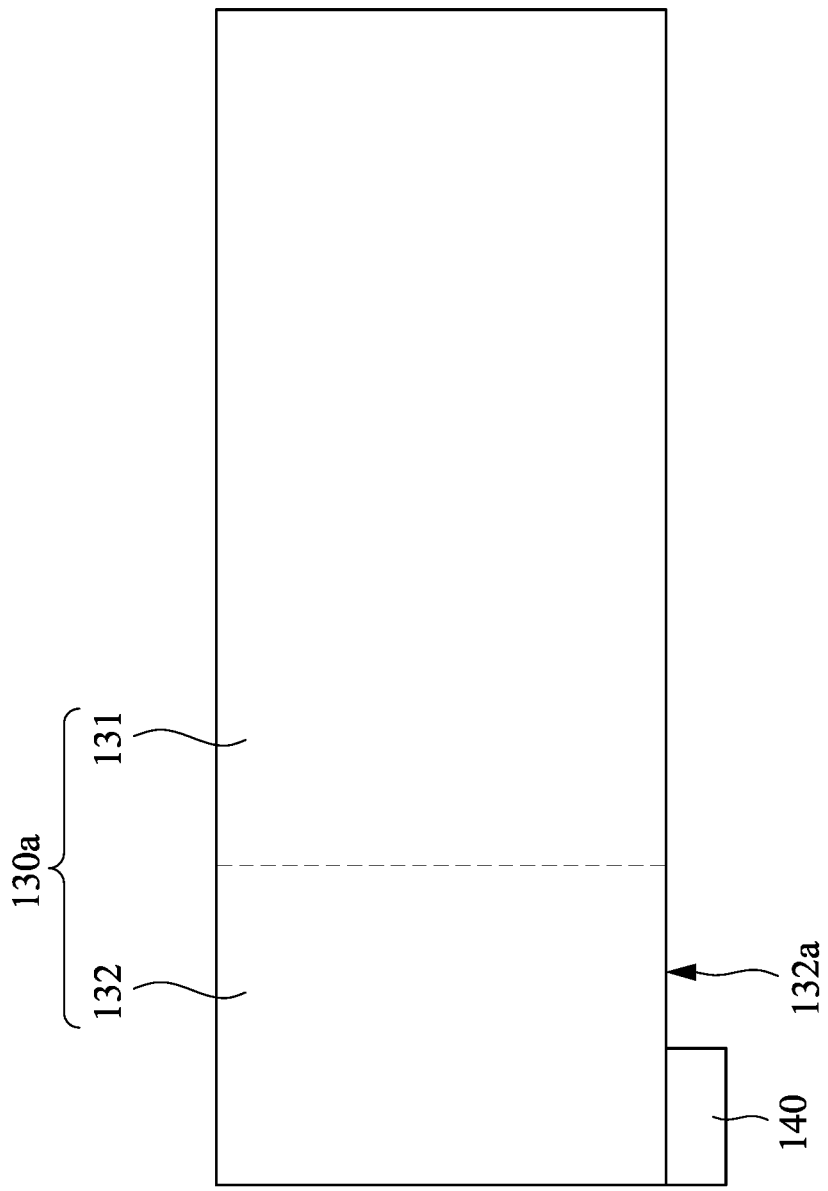
FIG. 1B is a schematic top view of the light guide plate that is flattened and the light emitting component in FIG. 1A.

FIG. 1B is a schematic top view of the light guide plate that is flattened and the light emitting component in FIG. 1A. Referring to FIGS. 1A and 1B, in this embodiment, the light guide plate 130a may be flexible, and the curved portion 132 can be bent or flattened, in which FIG. 1A shows the bent light guide plate 130a, whereas FIG. 1B shows the flattened light guide plate 130a. As seen from FIG. 1B, the light incident side 132a is one of the side surfaces of the curved portion 132, and the light emitting component 140 disposed at the light incident side 132a can emit light to the light incident side 132a.

Referring to FIG. 1A, when the light of the light emitting component 140 enters the curved portion 132 from the light incident side 132a, the light can travel inside the curved portion 132 wrapping the holder 110a by reflection, so that the light can travel to the light emitting portion 131. A plurality of scattering patterns, such as screentones or grooves, can be disposed on at least one of the upper surface 131a and the lower surface 131b of the light emitting portion 131, so that the light can be emitted from the upper surface 131a.

In contrast to the conventional display apparatus with the light guide plate, the embodiment can guide the light of the light emitting component 140 by using the light guide plate 130a including the curved portion 132, so that the light after passing through the curved portion 132 can be emitted uniformly from the light emitting portion 131, so as to reduce or avoid the uneven brightness due to the hot spots, thereby improving the quality of the display apparatus 100. In addition, it is necessary to note that in this embodiment, the quantity of the light emitting component 140 included by the display apparatus 100 is only one, but in other embodiment, the display apparatus 100 can include a plurality of light emitting components 140. Hence, the light emitting component 140 illustrated in the drawings does not limit the quantity of the light emitting component 140 included by the display apparatus 100.

Since the light guide plate 130a is flexible, the holder 110a which is wrapped with the curved portion 132 can support the curved portion 132, so as to avoid the deformation of the curved portion 132 duo to the collision. Moreover, the holder 110a can support the curved portion 132, so that the curved portion 132 does not bend excessively. Accordingly, the holder 110a can control the curvature of the curved portion 132, and the holder 110a can reduce or avoid the leakage of the light traveling in the curved portion 132, thereby improving the image brightness of the display apparatus 100.

FIG. 1C is a schematic top view of another light guide plate applied to the display apparatus in FIG. 1A. Referring to FIG. 1C, the light guide plate 130c in FIG. 1C can be applied to the display apparatus 100. In other words, the light guide plate 130a in FIG. 1A can be replaced by the light guide plate 130c. The light guide plates 130c and 130a are similar. For example, the light guide plate 130c is flexible and includes the light emitting portion 131, a light incident side 133c, and a curved portion 133, in which the curved portion 133 is connected to the light emitting portion 131.

Unlike the light guide plate 130a, the light incident side 133c of the curved portion 133 includes a recess (not shown) for accommodating the light emitting component 140, so that the light emitting component 140 can be embedded in the light incident side 133c of the curved portion 133. Accordingly, the light emitted from the light emitting component 140 can completely enter the curved portion 133 basically, so as to improve the image brightness of the display apparatus 100. In other embodiment, the display apparatus 100 can include a plurality of light emitting components 140, and the light emitting components 140 can be accommodated at least one recess of the light incident side 133c. Thus, FIG. 1C does not limit the quantities of both the light emitting component 140 and the recess of the curved portion 133.

Figure 1D:
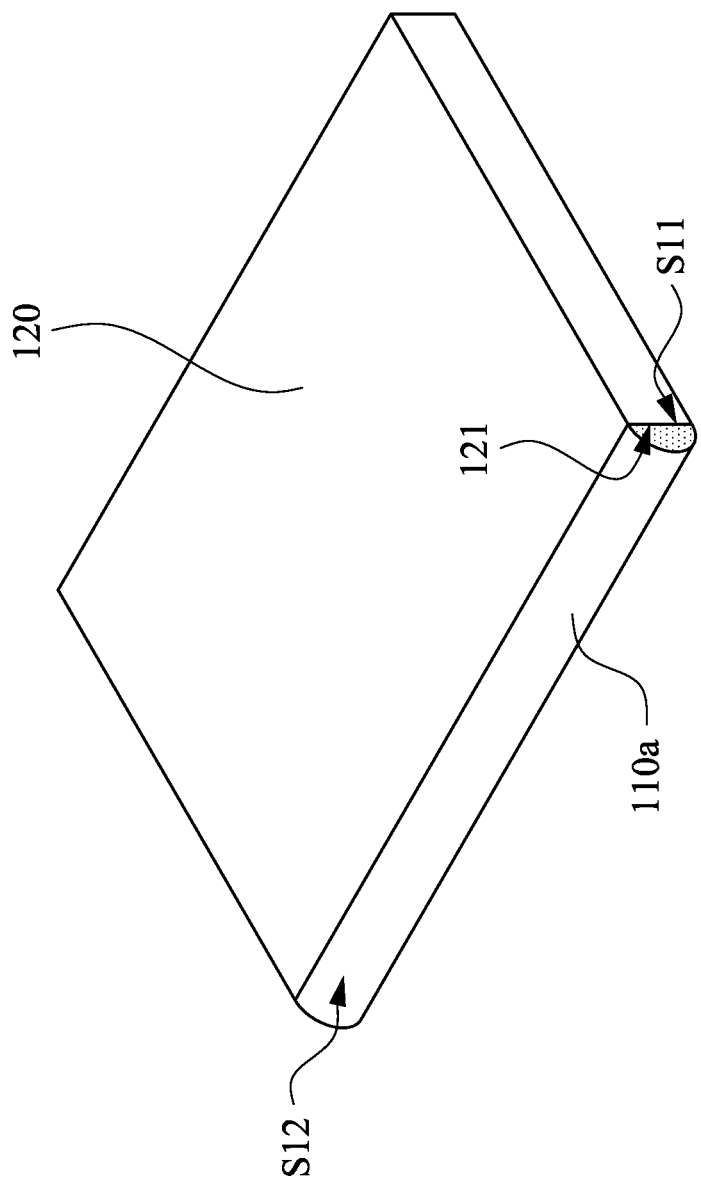
FIG. 1D is a schematic perspective view of the display panel and the holder in FIG. 1A.

FIG. 1D is a schematic perspective view of the display panel and the holder in FIG. 1A. Referring to FIGS. 1A and 1D, the holder 110a can take the shape of a semicircular cylinder, so that the holder 110a can include a plane S11 and a cylindrical surface S12, in which the plane S11 is connected to the side surface 121 of the display panel 120. For example, the plane S11 of the holder 110a can be adhered to the side surface 121 by adhesive, so that the holder 110a can be fixed to the display panel 120.

In this embodiment, the holder 110a can extend along the side surface 121 and cover the whole side surface 121, in which the holder 110a can extend from one side of the side surface 121 to the opposite side, as shown in FIG. 1D. However, in other embodiment, the width of the holder 110a can be less than the thickness T12 of the display panel 120, so that the holder 110a may not cover the whole side surface 121 to expose the part of the side surface 121. Hence, FIG. 1A which is merely for illustration does not limit the holder 110a to being covering the whole side surface 121. In addition, the width of the holder 110a can be larger than or equal to the half thickness T12.

Figure 1E:
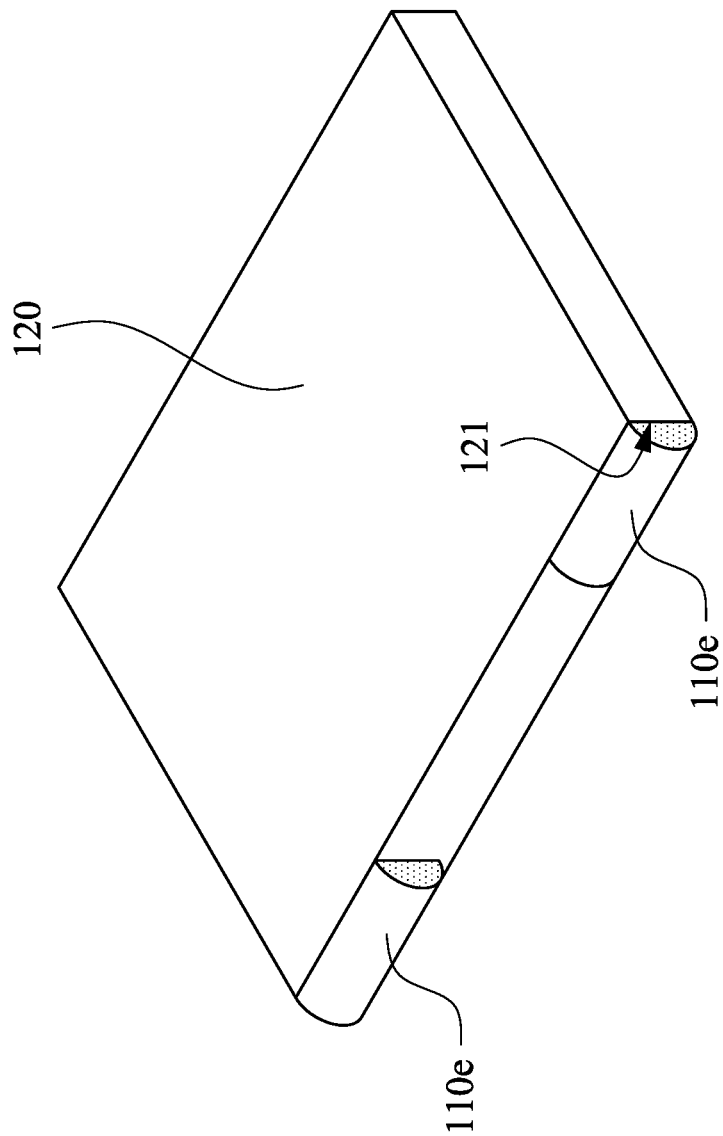
FIG. 1E is a schematic perspective view of another holder applied to the display apparatus in FIG. 1A.

FIG. 1E is a schematic perspective view of another holder applied to the display apparatus in FIG. 1A. Referring to FIG. 1E, the holder 110a of the display apparatus 100 can be replaced by a plurality of holders 110e. Regarding the shape, the holders 110e can be regarded as the division of the holder 110a in FIG. 1D. The holders 110e cover the part of the side surface 121, so that the partial side surface 121 is not covered by the holders 110e, where the holders 110e can be arranged in a line along the side surface 121. The function of the holders 110e is similar to the function of the holder 110a. Specifically, the holders 110e also can support the curved portion 132, so as to avoid the deformation of the curved portion 132 duo to the collision and to cause the curved portion 132 not to bend excessively, thereby reducing or avoiding the leakage of the light traveling in the curved portion 132.

It is particular to mention that the light guide plate 130a is flexible in this embodiment, but the light guide plate 130a can be rigid in other embodiment, and the curved portion 132 can be made by injection molding. In other words, the curved portion 132 cannot be bent and flattened in other embodiment. Hence, the light guide plate 130a is not limited to being flexible. In another embodiment, only the curved portion 132 of the light guide plate 130a is flexible.

Figure 2A:
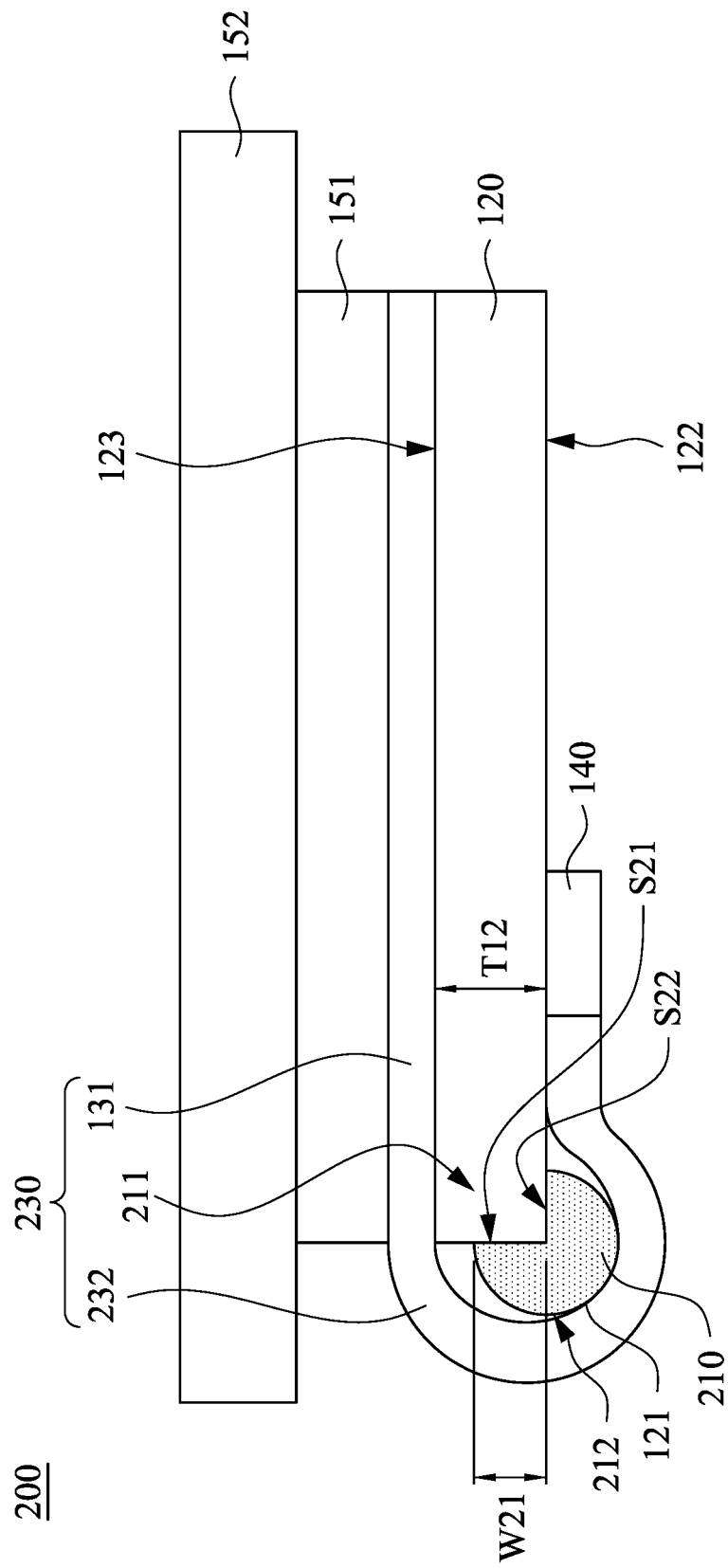
FIG. 2A is a schematic side view of a display apparatus according to another embodiment of the disclosure.
Figure 2B:
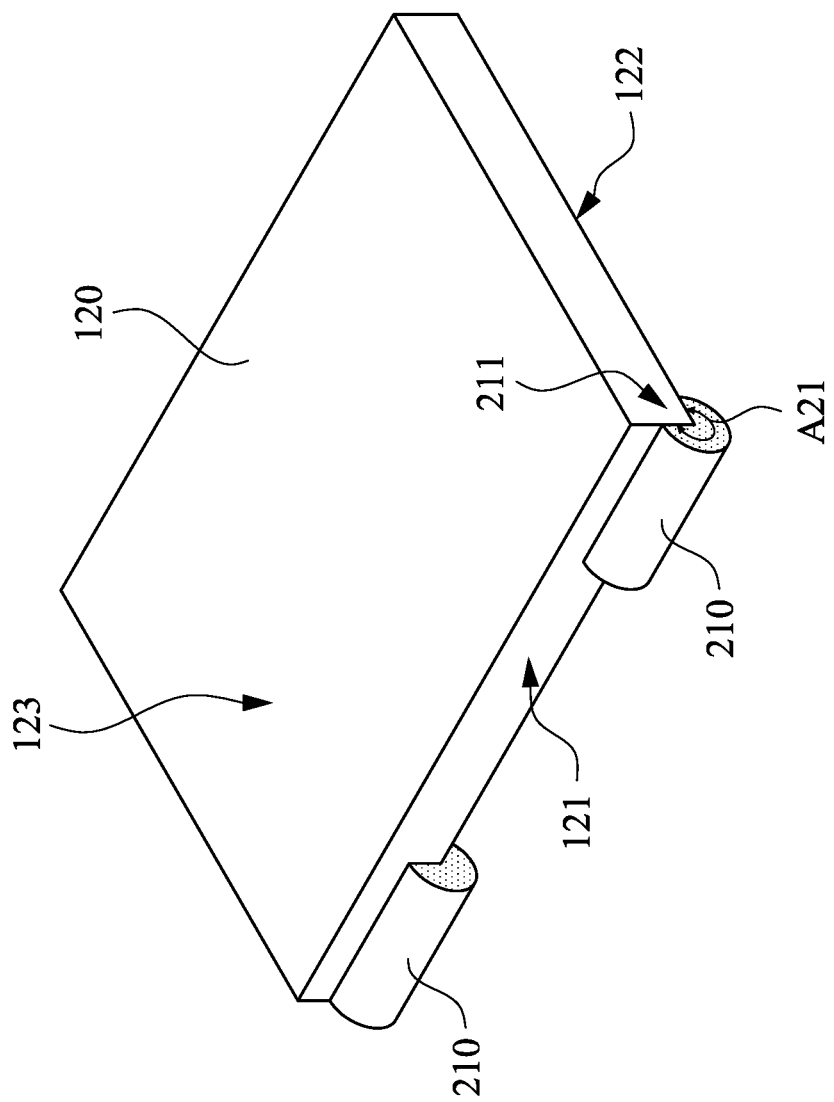
FIG. 2B is a schematic perspective view of the display panel and the holder in FIG. 2A.

FIG. 2A is a schematic side view of a display apparatus according to another embodiment of the disclosure, and FIG. 2B is a schematic perspective view of the display panel and the holder in FIG. 2A. Referring to FIGS. 2A and 2B, a display apparatus 200 of the embodiment is similar to the display apparatus 100 of the previous embodiment. For example, the display apparatus 200 is a reflective display and includes a light guide plate 230, the display panel 120, the light emitting component 140, the touch sensor panel 151, and the protective layer 152. The light guide plate 230 includes the light emitting portion 131 and a curved portion 232 connected to the light emitting portion 131, in which the curved portion 232 may be the curved portion 132 or 133 in the above embodiments. In other words, the light guide plate 230 may be the previous light guide plate 130a or 130c.

In contrast to the display apparatus 100 of the previous embodiment, the display apparatus 200 includes a plurality of holders 210 in this embodiment, where the holders 210 are arranged in a line along the side surface 121. Each of the holders 210 is attached to both the side surface 121 and the bottom surface 122 of the display panel 120. Specifically, each of the holders 210 includes a recess 211 for disposing the display panel 120, in which both the bottom surface 122 and the side surface 121 of the display panel 120 can form a corner (not labeled), and the corner can be disposed in the recesses 211.

Each of the recesses 211 can have a first plane S21 and a second plane S22 connected to the first plane S21, in which the area of the first plane S21 is substantially equal to the area of the second plane S22. Both the first plane S21 and the second plane S22 can be connected to the surface of the display panel 120, in which the first plane S21 is connected to the side surface 121, whereas the second plane S22 is connected to the bottom surface 122. The width W21 of the first plane S21 is less than the width of the side surface 121, but larger than or equal to the half width of the side surface 121, in which the width of the side surface 121 is equivalent to the thickness T12 of the display panel 120. Hence, each of the holders 210 covers the part of the side surface 121 and does not cover the edge of the top surface 123.

The holder 210 can take the shape of a major sector of cylinder, so that the holder 210 further includes a cylindrical surface 212. The cylindrical surface 212 extends from both edges of the first plane S21 and the second plane S22, while the first plane S21 and the second plane S22 intersect in the circular axis of the cylindrical surface 212. Accordingly, the straight line where the first plane S21 and the second plane S22 intersect in FIG. 2A is the abovementioned circular axis.

In the embodiment shown in FIG. 2A, the first plane S21 and the second plane S22 can be substantially perpendicular to each other, so that a cross section in the shape of a major sector can appear in a cross-sectional view of the holder 210 along a plane that is perpendicular to both the first plane S21 and the second plane S22, in which the central angle A21 of the major sector is apparently larger than 180°, such as 270°.

It is worth mentioning that in this embodiment, the display apparatus 200 includes a plurality of holders 210, and the holders 210 are arranged in a line along the side surface 121, but in other embodiment, the display apparatus 200 can include only one holder 210, and the holder 210 can extend along the side surface 121, where the holder 210 can extend from one side of the side surface 121 to the opposite side, as the holder 110a shown in FIG. 1D. Hence, the display apparatus 200 can include only one holder 210, and the embodiment does not limit the quantity of the holder 210 included by the display apparatus 200.

Figure 3:
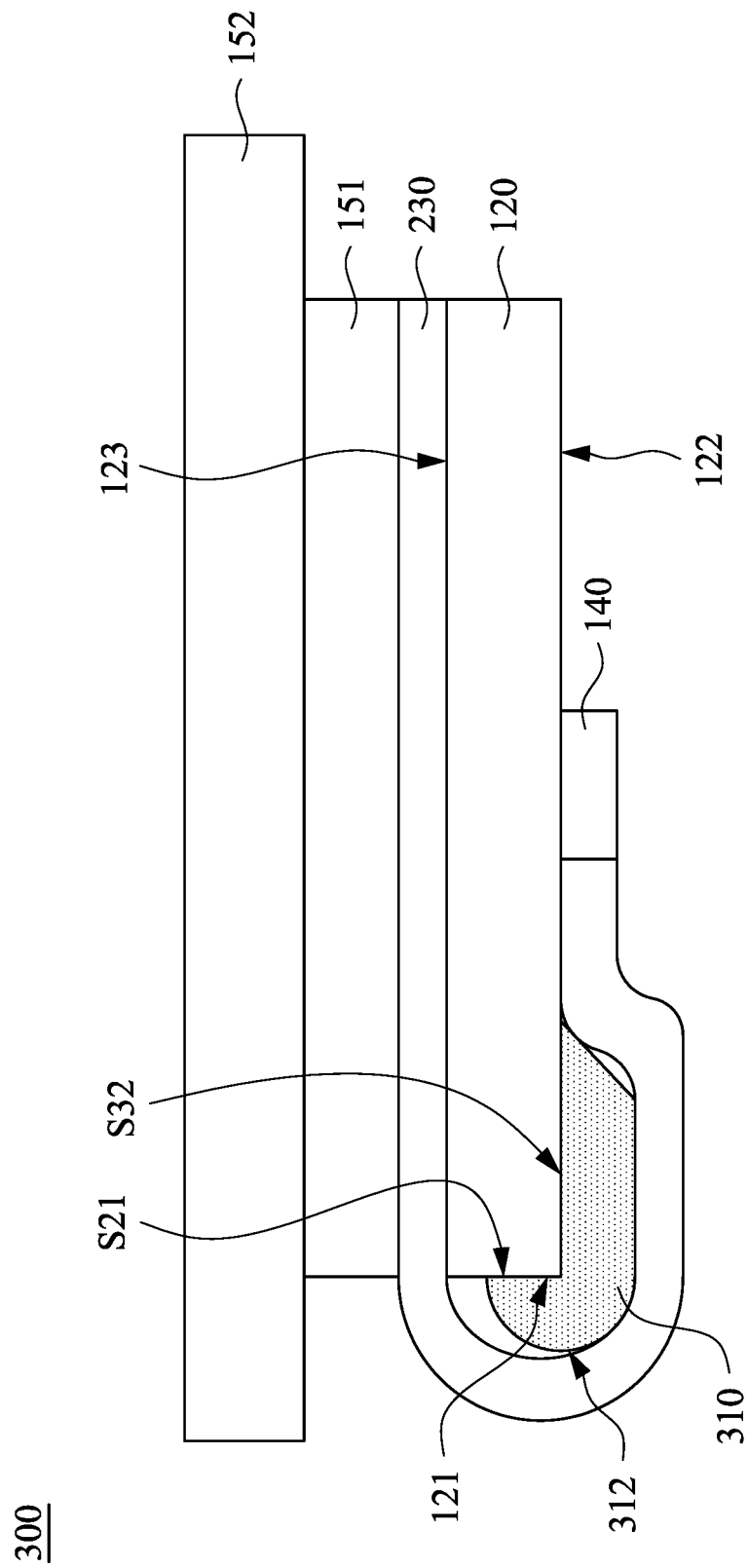
FIG. 3 is a schematic side view of a display apparatus according to another embodiment of the disclosure.

FIG. 3 is a schematic side view of a display apparatus according to another embodiment of the disclosure. Referring to FIG. 3, a display apparatus 300 of the embodiment is similar to the display apparatus 200 of the previous embodiment, but the difference is merely that at least one holder 310 included by the display apparatus 300 does not take the shape of the major sector of cylinder, so that the shape of the holder 310 is apparently different from the shape of the holder 210.

Specifically, the holder 310 also has the first plane S21, a second plane S32, and a cylindrical surface 312. However, the cylindrical surface 312 extends only from the edge of the first plane S21, not from the second plane S32, and the cylindrical surface 312 is not connected to the second plane S32. Moreover, the area of the first plane S21 is less than the area of the second plane S32, so that the area of the holder 310 attached to the side surface 121 is less than the area of the holder 310 attached to the bottom surface 122.

The display apparatus 300 can include only one holder 310 or a plurality of holders 310. When the display apparatus 300 includes only one holder 310, the holder 310 can extent along the side surface 121, in which the holder 310 can extend from one side of the side surface 121 to the opposite side, as the holder 110a shown in FIG. 1D. When the display apparatus 300 includes a plurality of holder 310, the holders 310 can be arranged in a line along the side surface 121, as the plurality of holders 210 shown in FIG. 2B.

It is particular to mention that the holders 110a, 110e, 210, and 310 include the cylindrical surfaces S12, 212, and 312 respectively in the above embodiments, but in other embodiment, the holders included by the display apparatuses 100, 200, and 300 cannot include any cylindrical surface. Accordingly, the shapes of the holders 110a, 110e, 210, and 310 shown in the drawings which are merely for illustration do not limit the shape of the holder. Moreover, the preceding holders 110a, 110e, 210, and 310 can be made of a soft material, in which the soft material is such as silicone, rubber, or polyurethane foam (e.g., PORON), so that all of the holders 110a, 110e, 210, and 310 can be flexible.

Figure 4:
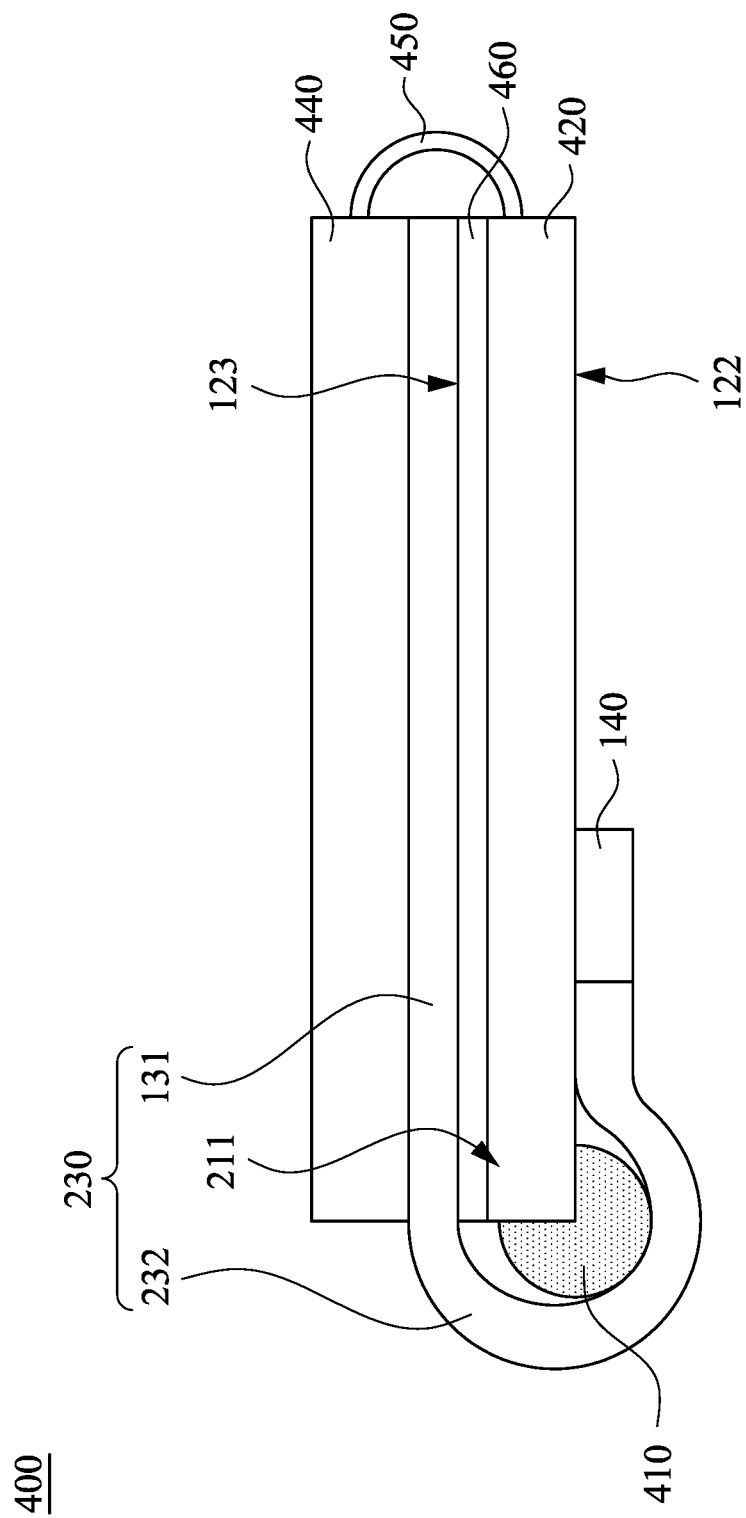
FIG. 4 is a schematic side view of a display apparatus according to another embodiment of the disclosure.

FIG. 4 is a schematic side view of a display apparatus according to another embodiment of the disclosure. Referring to FIG. 4, the display apparatus 400 of the embodiment and the display apparatus 200 of the previous embodiment are similar. For example, the display apparatus 400 includes not only the light guide plate 230 and the holder 410, but also a display panel 440, in which the holder 410 may be one of the holders 110a, 110e, 210, and 310 in the previous embodiments. However, unlike the display apparatus 200 of the previous embodiment, the display apparatus 400 of this embodiment is a transmissive display and further includes a circuit board 420, in which the holder 410 is fixed to the circuit board 420, and at least one part of the holder 410 is attached to the side surface of the circuit board 420, as shown in FIG. 4.

Specifically, the display panel 440 is a transmissive display panel, and the circuit board 420 is electrically connected to the display panel 440. For example, the circuit board 420 can be electrically connected to the display panel 440 via a flexible cable 450. The circuit board 420 can have a plurality of chips for controlling the display panel 440 to show images, and the display panel 440 is such as a liquid crystal display panel (LED), in which the light emitting portion 131 of the light guide plate 230 is disposed between the display panel 440 and the circuit board 420, as shown in FIG. 4.

When the light emitting component 140 emits the light, the light from the light emitting component 140 can be emitted from the light guide plate 230, so that the light can enter the display panel 440 from the light guide plate 230. Hence, the display apparatus 400 can show the images at the display panel 440. Moreover, the display apparatus 400 can further include a reflective layer 460, where the reflective layer 460 can be formed on the light emitting portion 131 and located between the circuit board 420 and the light emitting portion 131, and the reflective layer 460 may be a metal layer. The reflective layer 460 can reflect the light of the light emitting component 140, thereby improving the image brightness of the display apparatus 100.

Consequently, in contrast to the conventional display apparatus with the light guide plate, the abovementioned light guide plate including the curved portion can guide the light of the light emitting component and cause the light to exit uniformly from the light emitting portion after passing through the curved portion, so as to reduce or avoid the uneven brightness due to the hot spots, thereby improving the quality of the display apparatus.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A holder, suitable for a display apparatus, wherein the display apparatus comprises a light guide plate and a display panel, and the light guide plate comprises a light emitting portion and a curved portion connected to the light emitting portion,
   wherein the display panel has a bottom surface and a side surface connected to the bottom surface,
   wherein at least one part of the holder is attached to the side surface of the display panel, and the holder is wrapped with the curved portion of the light guide plate,
   wherein the holder takes the shape of a semicircular cylinder, and the holder comprises a plane connected to the side surface of the display panel.

2. A holder, suitable for a display apparatus, wherein the display apparatus comprises a light guide plate and a display panel, and the light guide plate comprises a light emitting portion and a curved portion connected to the light emitting portion,
   wherein the display panel has a bottom surface and a side surface connected to the bottom surface,
   wherein at least one part of the holder is attached to the side surface of the display panel, and the holder is wrapped with the curved portion of the light guide plate,
   wherein the holder further comprises:
   a recess, used for disposing the display panel, wherein the bottom surface and the side surface form a corner disposed in the recess,
   wherein the recess has a first plane and a second plane connected to the first plane, the first plane is connected to the side surface of the display panel, and the second plane is connected to the bottom surface of the display panel,
   wherein a width of the first plane is less than a width of the side surface of the display panel, and larger than or equal to a half width of the side surface of the display panel.

3. The holder of claim 2, wherein an area of the first plane is less than an area of the second plane.

4. The holder of claim 2, further comprising a cylindrical surface extending from an edges of the first plane and an edge of the second plane.

5. The holder of claim 4, wherein the first plane and the second plane intersect in a circular axis of the cylindrical surface.

6. The holder of claim 1, wherein the holder is attached to both the side surface and the bottom surface of the display panel.

7. A display apparatus, comprising:
   a display panel, having a bottom surface, a top surface opposite to the bottom surface, and a side surface connected to the bottom surface and the top surface;

a holder, fixed to the display panel, wherein at least one part of the holder is attached to the side surface of the display panel;
a light guide plate, comprising:
a light emitting portion, disposed on the top surface;
a curved portion, connected to the light emitting portion and covering the holder, wherein the curved portion has a light incident side; and
a light emitting component, disposed at the light incident side of the curved portion, wherein the display panel is located between the light emitting component and the light emitting portion.

8. The display apparatus of claim 7, wherein the holder takes the shape of a semicircular cylinder, and the holder comprises a plane connected to the side surface of the display panel.

9. The display apparatus of claim 7, wherein the holder comprises:
    a recess, used for disposing the display panel, wherein the bottom surface and the side surface form a corner disposed in the recess.

10. The display apparatus of claim 9, wherein the recess has a first plane and a second plane connected to the first plane, the first plane is connected to the side surface of the display panel, and the second plane is connected to the bottom surface of the display panel,
    wherein a width of the first plane is less than a width of the side surface, and larger than or equal to a half width of the side surface.

11. The display apparatus of claim 10, wherein an area of the first plane is less than an area of the second plane.

12. The display apparatus of claim 10, wherein the holder further comprises a cylindrical surface extending from an edges of the first plane and an edge of the second plane.

13. The display apparatus of claim 12, wherein the first plane and the second plane intersect in a circular axis of the cylindrical surface.

14. The display apparatus of claim 7, wherein the holder is attached to both the side surface and the bottom surface of the display panel.

15. The display apparatus of claim 7, wherein the curved portion of the light guide plate is rigid.

16. The display apparatus of claim 7, wherein the curved portion of the light guide plate is flexible.

17. The display apparatus of claim 7, wherein the light emitting component is embedded in the light incident side.

18. The display apparatus of claim 7, wherein the display panel is a reflective display panel.

19. The display apparatus of claim 7, further comprising:
    a touch sensor panel, disposed on the light emitting portion; and
    a protective layer, disposed on the touch sensor panel.

20. The display apparatus of claim 7, further comprising a plurality of the holders, wherein the holders are arranged in a line along the side surface.

21. A display apparatus, comprising:
    a display panel, having a bottom surface, a top surface opposite to the bottom surface, and a side surface connected to the bottom surface and the top surface;
    a circuit board, electrically connected to the display panel;
    a holder, fixed to the circuit board, wherein at least one part of the holder is attached to a side surface of the circuit board;
    a light guide plate, comprising:
    a light emitting portion, disposed between the display panel and the circuit board;
    a curved portion, connected to the light emitting portion and covering the holder, wherein the curved portion has a light incident side; and
    a light emitting component, disposed at the light incident side of the curved portion.

22. The display apparatus of claim 21, further comprising a reflective layer formed on the light emitting portion, wherein the reflective layer is located between the circuit board and the light emitting portion.

* * * * *